Patented Dec. 1, 1931

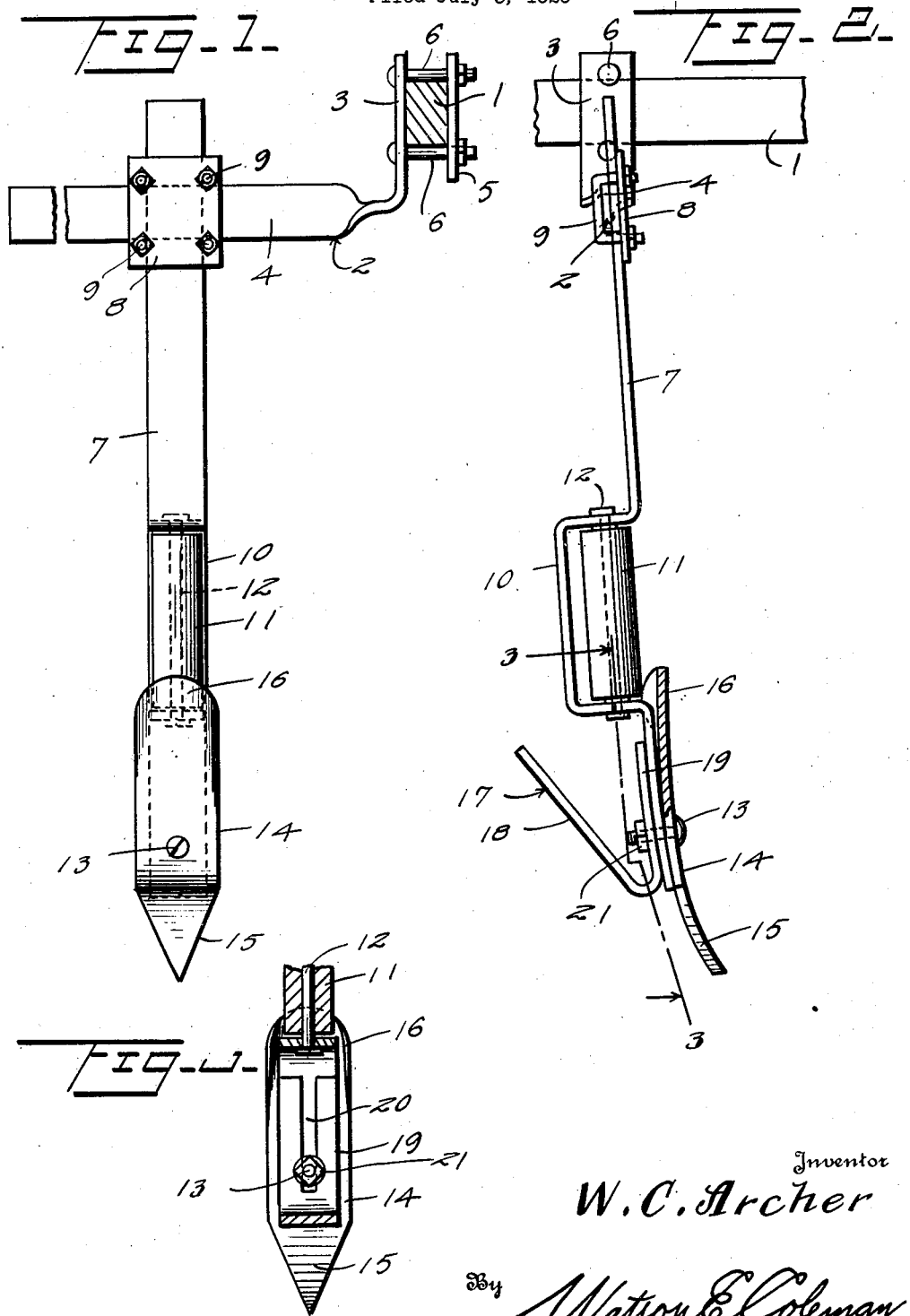

1,834,441

UNITED STATES PATENT OFFICE

WALTON CALOWAY ARCHER, OF NAPLES, TEXAS

VINE TURNER

Application filed July 3, 1929. Serial No. 375,807.

This invention relates to farm implements and pertains particularly to improvements in attachment for plows for use in the cultivation of watermelons, cantaloupes, cucumbers or sweet potato plants or any other plants of vinous character.

The primary object of the present invention is to provide a cultivating attachment for plows which will turn the vines being cultivated while a portion of the attachment works up the ground about the vine.

Another object of the invention is to provide a means for turning vines while the same are being cultivated, which will not in any way injure the vine by pulling or tearing the same.

The invention broadly contemplates the provision of a bracket adapted to be attached to a plow beam and carrying a vertical tooth bar at the lower end of which is mounted a cultivator tooth and an adjustable depth limiting foot. Above the earth penetrating member there is mounted upon the bar a roller over which the vines pass while the earth thereabout is being cultivated. In this manner the cultivating implement may be forced between the vines without danger of catching and tearing or pulling up the same.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a view in front elevation of the vine turner embodying the present invention showing the same applied to a plow beam.

Figure 2 is a side elevational view of the device showing a portion thereof in section.

Figure 3 is a sectional view taken on the line 3—3 of Figure 2.

Referring more particularly to the drawings wherein similar numerals of reference indicate similar parts throughout the several views, the numeral 1 indicates the beam of a plow or cultivator to which the present attachment may be fixed. In order to maintain the vine turner embodying this invention at the desired distance from the plow or cultivator beam 1 there is provided a bracket 2 which consists of a normally upstanding portion 3 which bears against the side of the beam 1 and a laterally projecting portion 4 to which the earth working tool forming a part of the device is secured. Associated with the upstanding portion or shank of the bracket 2 is a clamp plate 5 which positions against the opposite side of the plow beam and which is attached to the shank by the transverse bolts 6 in the manner shown.

Extending transversely of the arm portion 4 of the bracket is a bar 7 which extends downwardly toward the ground and which is maintained upon the bracket 2 at an angle to the ground. The upper end of the bar 7 lies across the arm 4 and has positioned against its front face the clamp plate 8 through which the shanks of a pair of U-bolts 9 pass, these bolts straddling the arm 4 of the bracket in the manner shown. From this it will be readily seen that the bar 7 which carries a tooth as will be hereinafter described may be adjusted laterally of the plow relative to the beam 1 and may also be adjusted vertically upon the arm 4 for regulating the penetration into the earth of the tooth carried thereby.

Adjacent its lower end the bar 7 is offset rearwardly as indicated at 10 and in the recess thus formed longitudinally of the bar there is positioned a roller 11, this roller carrying a trunnion 12 at each end which pivotally engages in the angular portion formed at each end of the offset 10 in the manner shown.

At its lower end the bar 7 has an aperture formed therethrough to receive a supporting screw 13, this screw passing through the central portion of an elongated tooth 14 which positions against the front of the bar at the lower end in the manner shown. The lower end of the tooth 14 is pointed as at 15 and extends a substantial distance below the bar 7 while the upper end of the tooth is slightly arcuate as indicated at 16 and covers the lower part of the roller 11, overlying the space between the lower end of the roller and the angular portion of the bar to which it is pivotally attached so that the stems or trailers of the vines being cultivated cannot become fixed under the roller and be torn.

Behind the tooth 14 there is positioned a depth regulating foot 17 which consists of a base portion 18 and an acutely angled arm 19 which is bifurcated as indicated at 20. The bifurcated end of this arm 19 positions against the back of the lower end of the bar 7 and has the bolt 13 passed therethrough, the holding nut 21 of the bolt frictionally engaging against the rear face of this bifurcated portion to clamp the same in position upon the bar. It will thus be seen that the foot 17 can be adjusted relative to the ground so that the point of the tooth 14 cannot go deeper into the ground than desired.

When in use while the earth between the rows of vines of the character referred to is being cultivated by a plow or cultivator the attachment embodying the present invention will pass along in relatively close proximity to the vines and will work the earth adjacent the vines and at the same time will pick up and turn the vines out so that the plow will not come into contact with and cut or otherwise damage the same.

Having thus described my invention, what I claim is:—

A combined earth working element and vine turner, comprising an elongated bar formed of flat strap like material throughout and designed to be secured at one end to a cultivator, said bar having an offset portion intermediate its ends providing a pair of laterally extending parallel sections, a pivot pin connecting said parallel sections, a roller member of constant diameter throughout rotatably mounted upon said pin and being of a diameter not greater than the width of the bar, and an elongated, substantially flat and straight tooth member secured to said bar at the other end and extending longitudinally thereof, said tooth member being relatively broad and covering said bar and further having its upper end projecting above the lower end of said roller and transversely arcuately formed to shield the same.

In testimony whereof I hereunto affix my signature.

WALTON C. ARCHER.